US012460476B2

(12) United States Patent
Zhang et al.

(10) Patent No.: US 12,460,476 B2
(45) Date of Patent: Nov. 4, 2025

(54) WINDOW COVERING SYSTEM

(71) Applicant: Nien Made Enterprise Co., Ltd., Taichung (TW)

(72) Inventors: You-Yu Zhang, Hsinchu County (TW); Chao-Hung Nien, Taichung (TW); Shih-Wei Hsu, Hsinchu County (TW)

(73) Assignee: Nien Made Enterprise Co., Ltd., Taichung (TW)

(*) Notice: Subject to any disclaimer, the term of this patent is extended or adjusted under 35 U.S.C. 154(b) by 237 days.

(21) Appl. No.: 18/523,827

(22) Filed: Nov. 29, 2023

(65) Prior Publication Data

US 2024/0191567 A1 Jun. 13, 2024

(30) Foreign Application Priority Data

Dec. 9, 2022 (TW) ................................ 111147604

(51) Int. Cl.
*E06B 9/322* (2006.01)
*E06B 9/24* (2006.01)

(52) U.S. Cl.
CPC ...... *E06B 9/322* (2013.01); *E06B 2009/2441* (2013.01)

(58) Field of Classification Search
CPC ............ E06B 9/322; E06B 2009/3222; E06B 2009/2441
See application file for complete search history.

(56) References Cited

U.S. PATENT DOCUMENTS

| | | | | |
|---|---|---|---|---|
| 6,369,530 B2 * | 4/2002 | Kovach | E06B 9/32 | 388/933 |
| 6,789,597 B2 * | 9/2004 | Wen | E06B 9/322 | 160/168.1 P |
| 7,923,948 B2 * | 4/2011 | Rodas | E06B 9/322 | 318/266 |
| 8,830,058 B2 * | 9/2014 | Yeh | A47H 5/0325 | 160/310 |
| 9,335,753 B2 * | 5/2016 | Baugh | E06B 9/322 | |
| 9,732,555 B2 * | 8/2017 | Morris | E06B 9/262 | |
| 9,765,565 B2 * | 9/2017 | Morris | E06B 9/262 | |
| 10,516,353 B2 * | 12/2019 | Rivera | E06B 9/322 | |
| 10,871,029 B2 * | 12/2020 | Ter Haar | E06B 9/325 | |

(Continued)

FOREIGN PATENT DOCUMENTS

NL 2020475 B1 * 2/2019 ............ E06B 9/262

*Primary Examiner* — Johnnie A. Shablack
(74) *Attorney, Agent, or Firm* — Winston Hsu

(57) ABSTRACT

A window covering system and a calibration method therefor are provided for generating a safe distance between a middle rail and a lower rail according to status of a first lifting cord. The calibration method includes moving the middle and lower rails upwardly until reaching their initial positions, moving down the lower rail a predetermined distance and storing the detected position thereof as a first position, moving down the middle rail until a switch transmits a first signal as the first lifting cord running through the switch becomes loose, moving up the middle rail until the switch stops transmitting the first signal as the first lifting cord becomes tense, storing the detected position of the middle rail as a second position, and generating the safe distance according to the first and the second positions such that the middle rail is prevented from being pushed by the lower rail.

20 Claims, 10 Drawing Sheets

(56) References Cited

U.S. PATENT DOCUMENTS

| | | | | | |
|---|---|---|---|---|---|
| 10,895,105 | B1 * | 1/2021 | Marchese | E06B 9/322 |
| 11,035,172 | B2 * | 6/2021 | Rieper | E06B 9/322 |
| 11,486,193 | B2 * | 11/2022 | Chiang Huang | E06B 9/322 |
| 11,933,103 | B2 * | 3/2024 | Liang | E06B 9/303 |
| 12,078,011 | B2 * | 9/2024 | Zhang | H02P 5/74 |
| 12,123,257 | B2 * | 10/2024 | Dupielet | E06B 9/322 |
| 12,237,800 | B2 * | 2/2025 | Nien | H02P 6/30 |
| 12,286,836 | B2 * | 4/2025 | Lagarde | E06B 9/322 |
| 2018/0080279 | A1 * | 3/2018 | Eubanks, Sr. | E06B 9/38 |
| 2021/0238920 | A1 * | 8/2021 | Zhang | E06B 9/262 |
| 2022/0085738 | A1 * | 3/2022 | Nien | E06B 9/322 |
| 2023/0009409 | A1 * | 1/2023 | Lagarde | E06B 9/322 |
| 2023/0019542 | A1 * | 1/2023 | Dupielet | E06B 9/322 |
| 2024/0191567 | A1 * | 6/2024 | Zhang | E06B 9/262 |
| 2025/0003288 | A1 * | 1/2025 | Yang | E06B 9/262 |
| 2025/0027363 | A1 * | 1/2025 | Chen | E06B 9/303 |

* cited by examiner

WINDOW COVERING SYSTEM

BACKGROUND OF THE DISCLOSURE

1. Field of the Disclosure

The present disclosure generally relates to a window covering system, and more particularly relates to a window covering system can generate a safe distance between the middle rail and the lower rail by detecting the status of the lifting cords.

2. Description of the Prior Art

As consumers increasingly demand better home quality, various styles of window coverings have emerged in the market for them to choose from, such as roller shades, Venetian blinds and curtains.

In order to enhance flexibility of controlling the window covering and convenience of adjusting the light transmission level, a window covering having the upper, middle, and lower rails with two covering bodies disposed among them can be employed, in which one covering body is connected between the upper and middle rails, and another covering body is connected between the middle and lower rails. The light transmittance of the covering bodies is different from each other. By adjusting the positions of the middle and lower rails, the extension degree of the two covering bodies as well as the proportion of the extensions of the two covering bodies can be adjusted, resulting in various levels of light transmittance and shading effects. This brings enhanced convenience to the users for daily life.

The above-mentioned type of window covering has several lifting cords disposed in the upper rail, running through at least one of the covering bodies, and connected to the middle or lower rail. For both the middle and lower rails, they will be in position when their own weight has balanced with the tension of their corresponding lifting cords which are tense. When the lifting cords are driven to be wound up within the upper rail, the lifting cords bring the middle or lower rail to ascend. By contrast, when the lifting cords are driven to be unwound within the upper rail, the middle or lower rail descends because of its own weight. Therefore, the proportion of extensions of the covering bodies can be adjusted. Although this structure can function, it has a drawback based on practical observation that the middle rail would be pushed up by the lower rail when the middle rail and lower rail become too close to each other. Once this has happened, the balance of the middle rail's weight and the tension of the corresponding lifting cords is disrupted, making the tension in the lifting cords those are connected to the middle rail excessively loose. Thus, the lifting cords are wound loosely on the corresponding spools and easily fall off from the spools, which results in malfunctions. It can be observed from the above that there is a lack of an adequate solution for timely detecting and maintaining a suitable safe distance between the middle rail and the lower rail in the field to which the present disclosure relates.

For solving the above-mentioned problem of falling off of the lifting cords, a fixed distance can be preset when manufacturing the window coverings, and is served as a safe distance between the middle rail and the lower rail. Thus, the movement of one of the two rails would be stopped once that moving rail has reached a position spaced apart from the other one of the two rails by the fixed distance. However, some problems are found when the covering bodies are in a cellular type with honeycomb shapes. The covering bodies having this structure possess elasticity with a tendency to extend, which becomes more pronounced after prolonged usage, especially if the covering bodies are frequently kept in an extended state. When retracted without excessive compression, the covering body exhibits a greater retraction thickness than that during initial usage due to its inherent elasticity with the tendency to extend. If the safe distance between the middle rail and the lower rail remains the fixed distance all the time, the retracted covering body with greater thickness would push the middle rail upward and cause slack of the lifting cords, whereby the window covering falls within a risk of resulting malfunctions as mentioned above. On the other hand, if the middle rail has been positioned near the upper rail in which the covering body has been fully retracted between the middle rail and the lower rail, once the middle rail is pushed by the elasticity of covering body, the covering body will be forced to become over-compressed because the middle rail has no space to move upward, resulting in unexpected creases thereon. On the other hand, if the fixed distance is preset to a greater value in advance for preventing the middle rail from being pushed by the covering body after prolonged usage, the covering body will be unable to be fully retracted during the initial usage of the window covering and cause unaesthetic visual effect of the overall appearance of the window covering.

In addition, the safe distance between the middle and lower rails required in practice varies according to the material and the length of the dropped covering body of the window covering. If the safe distance is preset as a fixed value, the window covering would have a drawback of incomplete or excessive retraction of the covering body.

SUMMARY OF THE DISCLOSURE

In light of the above reasons, one aspect of the present disclosure is to provide a window covering system. In one embodiment, the window covering system includes a window covering assembly and a controller. The window covering assembly includes an upper rail, a middle rail, a lower rail, a first driving device, a second driving device, a first lifting cord, a second lifting cord, a first position detector, a second position detector and a switch. The middle rail is disposed below the upper rail. The lower rail is disposed below the middle rail. The first driving device and the second driving device are disposed on the upper rail. The first lifting cord is connected between the first driving device and the middle rail, and is drivable by the first driving device to be wound up or unwound for moving the middle rail upwardly or downwardly. The second lifting cord is connected between the second driving device and the lower rail, and is drivable by the second driving device to be wound up or unwound for moving the lower rail upwardly or downwardly. The first position detector is disposed on the first driving device for detecting a current position of the middle rail and generating a middle rail position message. The second position detector is disposed on the second driving device for detecting a current position of the lower rail and accordingly generating a lower rail position message. The switch is configured to transmit a first signal in response to the first lifting cord in a first status, and configured to stop transmitting the first signal in response to the first lifting cord in a second status. The controller is electrically coupled to the switch, the first driving device, the second driving device, the first position detector and the second position detector. The controller stores a calibration command. When the calibration command is executed, the controller is configured to control the first driving device and the second driving device, and to receive the first signal transmitted by the switch, the middle rail position message generated by the first position detector, and the lower rail position message generated by the second position detector. Moreover, when the calibration command is executed, the controller is further configured to: activate the second driving device to unwind the second lifting cord for moving the lower rail downwardly by a first predetermined distance; stop the second driving device when the second position detector detects the lower rail has moved downwardly by the first predetermined distance from a lower rail initial position; receive the lower rail position message generated by the second position detector, and store the lower rail position message as a first position; activate the first driving device to unwind the first lifting cord by which the middle rail is moved downwardly until receiving the first signal transmitted by the switch, which stops the first driving device by which movement of the middle rail is halted; activate the first driving device to wind up the first lifting cord by which the middle rail is moved upwardly until the first signal is stopped from being transmitted by the switch, which stops the first driving device by which the movement of the middle rail is halted; receive the middle rail position message generated by the first position detector, and store the middle rail position message as a second position; and generate a safe distance between the middle rail and the lower rail.

In another embodiment, the window covering system includes a window covering assembly and a controller, wherein the window covering assembly includes an upper rail, a middle rail, a lower rail, a first driving device, a second driving device, a first lifting cord, a second lifting cord, a first position detector, a second position detector and a switch. The middle rail is disposed below the upper rail. The lower rail is disposed below the middle rail. The first driving device and the second driving device are disposed on the upper rail. The first lifting cord is connected between the first driving device and the middle rail, and is drivable by the first driving device to be wound up or unwound for moving the middle rail upwardly or downwardly. The second lifting cord is connected between the second driving device and the lower rail, and is drivable by the second driving device to be wound up or unwound for moving the lower rail upwardly or downwardly. The first position detector is disposed on the first driving device for detecting a current position of the middle rail and generating a middle rail position message. The second position detector is disposed on the second driving device for detecting a current position of the lower rail and generating a lower rail position message. The switch is configured to transmit a first signal in response to the first lifting cord in a first status, and configured to stop transmitting the first signal in response to the first lifting cord in a second status. The controller is electrically coupled to the switch, the first driving device, the second driving device, the first position detector and the second position detector. The controller stores a calibration command. When the calibration command is executed, the controller is configured to control the first driving device and the second driving device, and to receive the first signal transmitted by the switch, the middle rail position message generated by the first position detector, and the lower rail position message generated by the second position detector. Moreover, when the calibration command is executed, the controller is further configured to: activate the second driving device to unwind the second lifting cord for moving the lower rail downwardly by a first predetermined distance; stop the second driving device when receiving the current lower rail position message indicating that the lower rail has moved downwardly by the first predetermined distance from a lower rail initial position, which is detected and generated by the second position detector; activate the first driving device to unwind the first lifting cord for moving the middle rail downwardly until receiving the first signal transmitted by the switch, which stops the first driving device, thereby halting the movement of the middle rail; activate the first driving device to wind up the first lifting cord for moving the middle rail upwardly until the first signal is stopped from being transmitted by the switch, which stops the first driving device, thereby halting the movement of the middle rail; receive the middle rail position message generated by the first position detector, and store the middle rail position message as a second position; and generate a safe distance between the middle rail and the lower rail; wherein when the first driving device is stopped and the middle rail is halted from moving downwardly in response to the first signal transmitted by the switch, the middle rail position message generated by the first position detector then is received and stored as a third position, and the safe distance between the middle rail and the lower rail is generated according to the second position and the third position.

In still another embodiment, the window covering system includes a window covering assembly and a controller, wherein the window covering assembly includes an upper rail, a middle rail, a lower rail, a first driving device, a second driving device, a first lifting cord, a second lifting cord, a first position detector, a second position detector and a switch. The middle rail is disposed below the upper rail. The lower rail is disposed below the middle rail. The first driving device and the second driving device are disposed on the upper rail. The first lifting cord is connected between the first driving device and the middle rail, and is drivable by the first driving device to be wound up or unwound for moving the middle rail upwardly or downwardly. The second lifting cord is connected between the second driving device and the lower rail, and is drivable by the second driving device to be wound up or unwound for moving the lower rail upwardly or downwardly. The first position detector is disposed on the first driving device for detecting a current position of the middle rail and generating a middle rail position message. The second position detector is disposed on the second driving device for detecting a current position of the lower rail and generating a lower rail position message. The switch is configured to transmit a first signal in response to the first lifting cord in a first status and stop transmitting the first signal in response to the first lifting cord in a second status. The controller is electrically coupled to the switch, the first driving device, the second driving device, the first position detector and the second position detector. The controller stores a calibration command. When the calibration command is executed, the controller is configured to control the first driving device and the second driving device, and configured to receive the first signal transmitted by the switch, the middle rail position message generated by the first position detector, and the lower rail position message generated by the second position detector. Moreover, when the calibration command is executed, the controller is further configured to: activate the second driving device to unwind the second lifting cord for moving the lower rail downwardly by a first predetermined distance; stop the second driving device in response to the lower rail moving downwardly by the first predetermined distance from a lower rail initial position, as detected by the second position detector; and generate a safe distance between the middle rail and the lower rail; wherein the first driving device is activated to unwind the first lifting cord by which the middle rail is moved downwardly until receiving the first signal transmitted by the switch, which stops the first driving device and thereby halts the movement of the middle rail, and at this moment, the middle rail position message generated by the first position detector is received and stored as a fourth position, and the safe distance between the middle rail and the lower rail is generated according to the fourth position and the first predetermined distance.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1A:
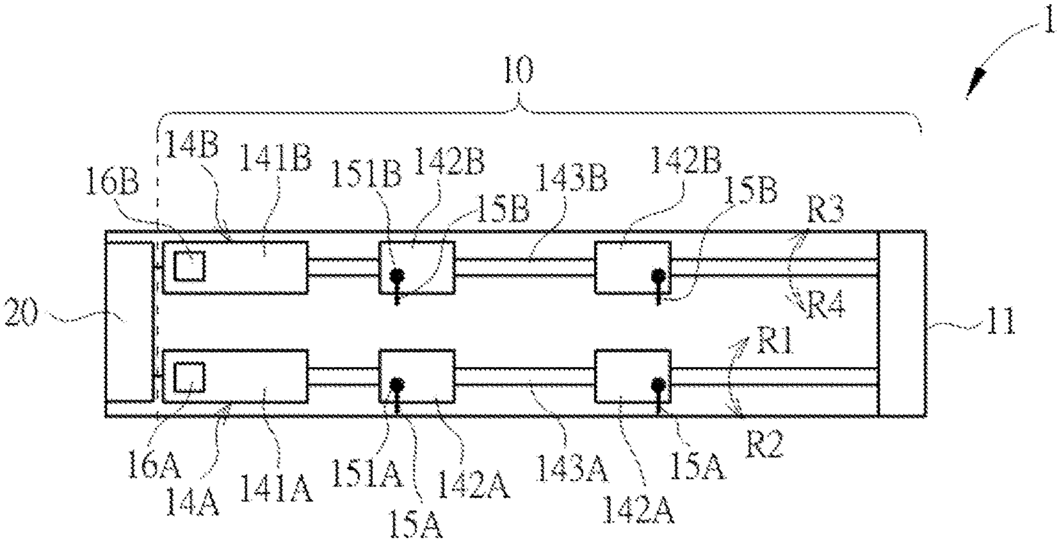
FIG. 1A schematically illustrates a top view of the window covering system according to one embodiment of the present disclosure.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person having ordinary skill in the art. The terms regarding directions mentioned in the specification, including "front", "rear", "up", "down", "left", "right", "top", "bottom", "inside", and "outside", are illustrative and descriptive terms based on common usage scenarios, and manifests no intent to limit the scope of claims.

Furthermore, the definite and indefinite articles "a" and "the" and the numerical term "one" used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Figure 1B:
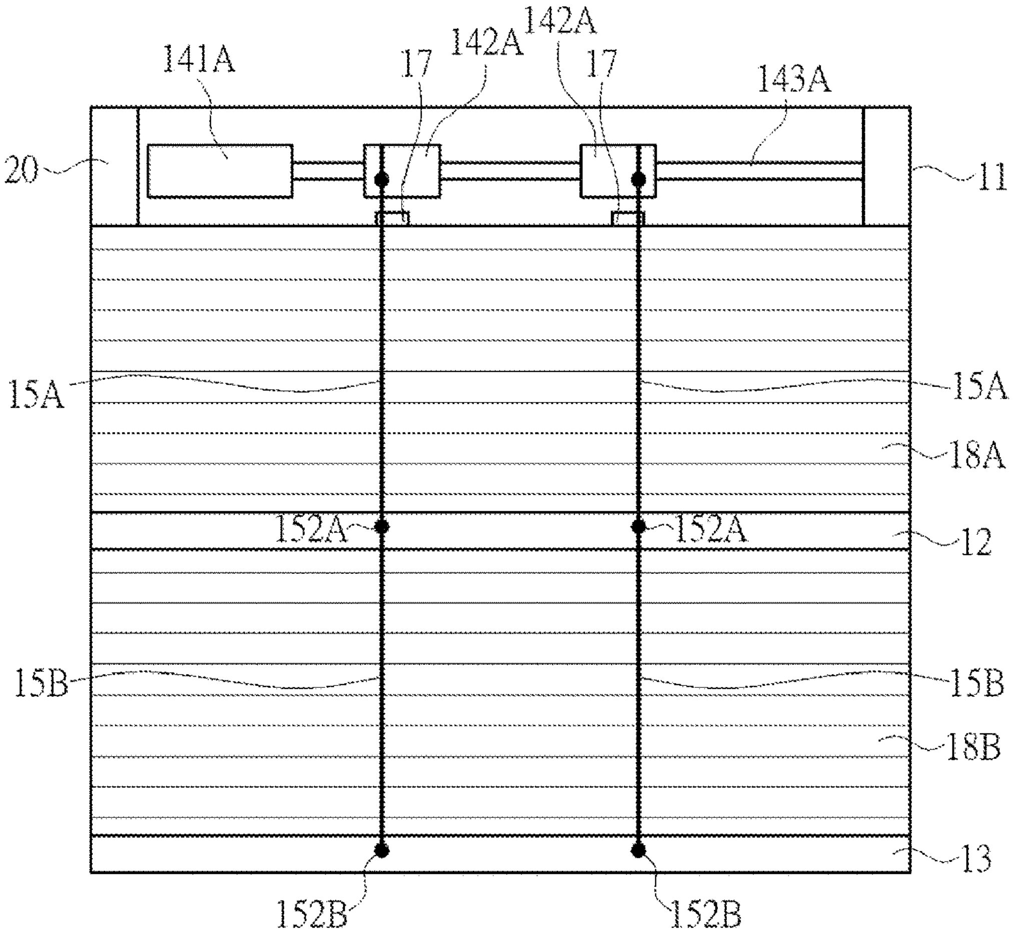
FIG. 1B schematically illustrates a front view of the window covering system in FIG. 1A.

Please refer to FIGS. 1A and 1B, which schematically illustrate the window covering system according to one embodiment of the present disclosure. The window covering system 1 includes a window covering assembly 10 and a controller 20. The window covering assembly 10 includes an upper rail 11, a middle rail 12, a lower rail 13, a first driving device 14A, a second driving device 14B, two first lifting cords 15A, two second lifting cords 15B, a first position detector 16A, a second position detector 16B, two switches 17, a first covering material 18A and a second covering material 18B.

Figure 2:
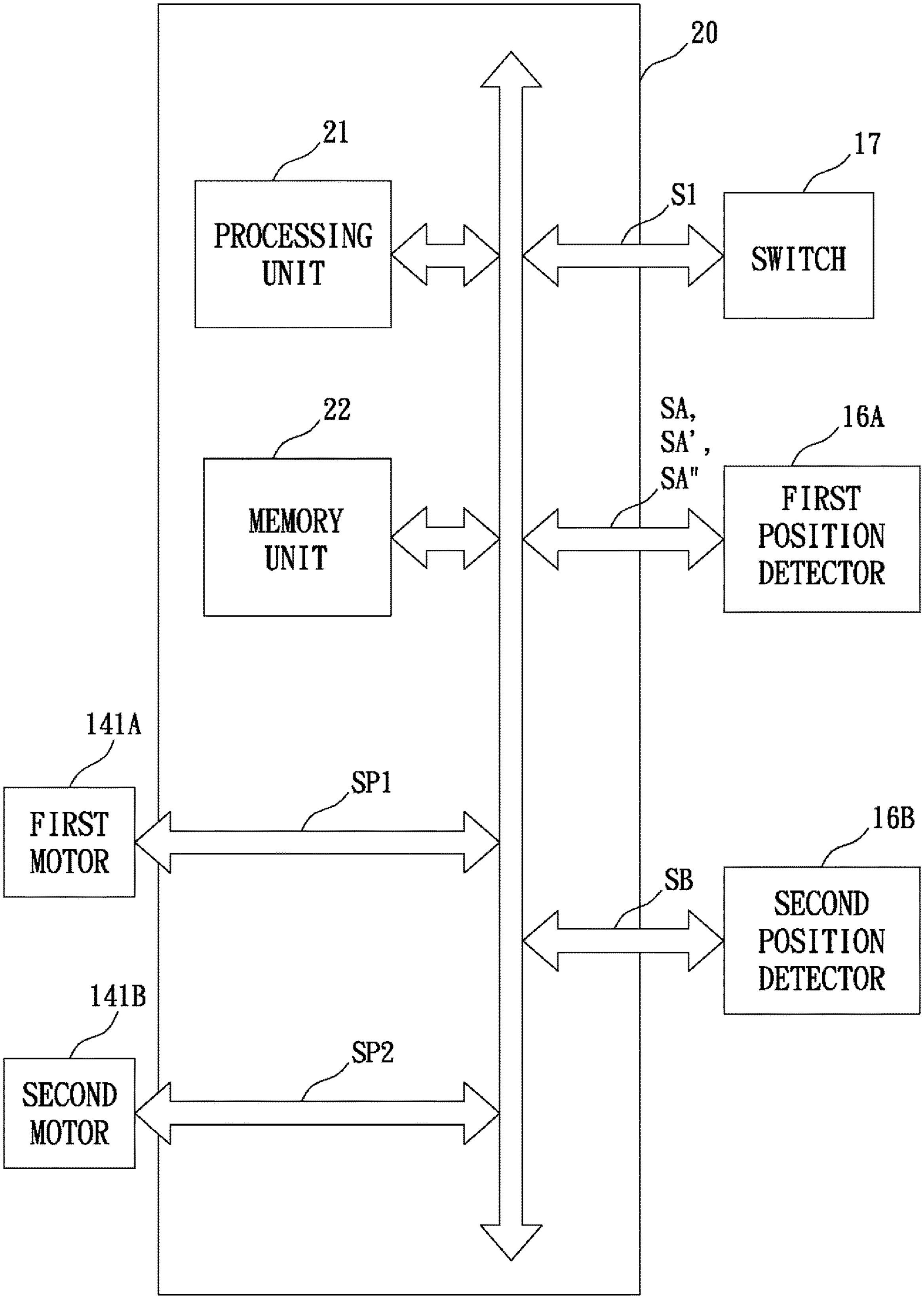
FIG. 2 schematically illustrates a block diagram illustrating electrical coupling relationship and operation of the controller in FIGS. 1A and 1B.

FIG. 2 is a schematic diagram illustrating electrical coupling relationship and operation of the controller 20 in FIGS. 1A and 1B. Referring to FIG. 1A, FIG. 1B, and FIG. 2, the controller 20 is electrically coupled to a first motor 141A of the first driving device 14A for transmitting a first protective stopping signal SP1, and electrically coupled to a second motor 141B of the second driving device 14B for transmitting a second protective stopping signal SP2. The controller 20 is also electrically coupled to the switches 17 for receiving a first signal S1. In addition, the controller 20 is electrically coupled to a first position detector 16A for receiving a middle rail position message SA, SA' or SA", and electrically coupled to a second position detector 16B for receiving a lower rail position message SB. The controller 20 includes a processing unit 21 and a memory unit 22, which will be described in detail in the following description.

The middle rail 12 is disposed below the upper rail 11, while the lower rail 13 is disposed below the middle rail 12. The two ends of the first covering material 18A are respectively connected to the upper rail 11 and the middle rail 12, and the two ends of the second covering material 18B are respectively connected to the middle rail 12 and the lower rail 13. In some other embodiments, the window covering assembly is in a top-down-bottom-up (i.e., TDBU) type and only includes one covering material connected between the middle rail and the lower rail. The first driving device 14A and the second driving device 14B are disposed in the upper rail 11. In this embodiment, the first driving device 14A includes a first motor 141A, two first rotating members 142A and a first transmission shaft 143A. The first motor 141A is connected to the first transmission shaft 143A. The first rotating members 142A are fixedly disposed on the first transmission shaft 143A, and the first lifting cords 15A are respectively connected to the first rotating members 142A by a first end 151A of each of them. When the first motor 141A drives the first transmission shaft 143A to rotate, the first transmission shaft 143A may drive the first rotating members 142A to rotate in a first rotating direction R1 for winding the first lifting cords 15A up onto the corresponding first rotating members 142A, or the first transmission shaft 143A may drive the first rotating members 142A to rotate in a second rotating direction R2 for unwinding the first lifting cords 15A from the corresponding first rotating members 142A. The first rotating direction R1 and the second rotating direction R2 are different or opposite directions.

In the present embodiment, the second driving device 14B includes a second motor 141B, two second rotating members 142B and a second transmission shaft 143B. The second motor 141B is connected to the second transmission shaft 143B. The second rotating members 142B are fixedly disposed on the second transmission shaft 143B, and the second lifting cords 15B are respectively connected to the second rotating members 142B by a first end 151B of each of them. When the second motor 141B drives the second transmission shaft 143B to rotate, the second transmission shaft 143B may drive the second rotating member 142B to rotate in a third rotating direction R3 for winding the second lifting cords 15B up onto the corresponding second rotating members 142B, or alternatively, or the second transmission shaft 143B may drive the second rotating members 142A to rotate in a fourth rotating direction R4 for unwind the second lifting cords 15B from the corresponding second rotating members 142B. The third rotating direction R3 and the fourth rotating direction R4 are different or opposite directions.

In the present embodiment, for each of the first lifting cords 15A, the first end 151A of it is fixed to the corresponding first rotating member 142A of the first driving device 14A, while a second end 152A of it is connected to the middle rail 12 after running through the first covering material 18A. When the first motor 141A of the first driving device 14A drives the first rotating members 142A to rotate, the first lifting cords 15A are wound up or unwound, so that the middle rail 12 is controlled to move upwardly or downwardly. More specifically, when the first lifting cords 15A are wound up onto the corresponding first rotating members 142A, the middle rail 12 moves upwardly. By contrast, when the first lifting cords 15A are unwound from the corresponding first rotating members 142A, the middle rail 12 moves downwardly. In a similar manner, for each of the second lifting cords 15B, the first end 151B of it is fixed to the corresponding second rotating member 142B of the second driving device 14B, while a second end 152B of it is connected to the lower rail 13 after running through both the first covering material 18A and the second covering material 18B. When the second motor 141B of the second driving device 14B drives the second rotating members 142B to rotate, the second lifting cords 15B are wound up or unwound, so that the lower rail 13 is controlled to move upwardly or downwardly. More specifically, when the second lifting cords 15B are wound onto the corresponding second rotating members 142B, the lower rail 13 moves upwardly. By contrast, when the second lifting cords 15B are unwound from the corresponding second rotating members 142B, the lower rail 13 moves downwardly.

Referring to FIGS. 1A and 1B, the two first lifting cords 15A are located between the upper rail 11 and the middle rail 12, and the two second lifting cords 15B are located between the upper rail 11 and the lower rail 13. However, the amounts of the first lifting cords and the second lifting cords are not limited thereto. For evenly adjusting the positions of the middle rail 12 and the lower rail 13A, a greater amount of the first lifting cords can be disposed between the upper rail 11 and the middle rail 12, and a greater amount of the second lifting cords can be disposed between the upper rail 11 and the lower rail 13. On the other hand, in case that the covering bodies have narrower widths, the window covering assembly of the present disclosure also can have only one first lifting cord located between the upper rail 11 and the middle rail 12, and one second lifting cord located between the upper rail 11 and the lower rail 13.

By adjusting the positions of the middle rail 12 and the lower rail 13, the proportion of the extensions of the first covering material 18A and the second covering material 18B can be adjusted. In one embodiment, the light transmittance of the first covering material 18A differs from that of the second covering material 18B, which allows users to conveniently adjust the overall window covering's light transmission level. In another embodiment, the patterns and/or colors of the first covering material 18A and the second covering material 18B are different, which is convenient for users to adjust the overall appearance of the window covering according to requirements.

As shown in FIG. 1A, FIG. 1B, and FIG. 2, the first position detector 16A is disposed on the first driving device 14A for detecting the current position of the middle rail 12 and accordingly generating the middle rail position messages SA, SA' and SA". The second position detector 16B is disposed on the second driving device 14B for detecting the current position of the lower rail 13 and accordingly generating the lower rail position message SB.

Each of the first position detector 16A and the second position detector 16B may include an encoder for measuring the motion and the position of the components, in which the encoder may include a rotary encoder, an incremental encoder, a mechanical contact encoder, an optical encoder, an electromagnetic encoder, a capacitive encoder and/or other suitable encoders.

The first position detector 16A and the second position detector 16B may be disposed within the upper rail 11. In the present embodiment, for generating the middle rail position messages SA, SA' and SA", the first position detector 16A is configured to detect the rotating direction, the number of rotations, and the angle of the rotor of the first motor 141A. Meanwhile, for generating the lower rail position message SB, the second position detector 16B is configured to detect the rotating direction, the number of rotations, and the angle of the rotor of the second motor 141B. However, the detection targets of the first position detector 16A and the second position detector 16B are not limited to the rotors of the first motor 141A and the second motor 141B. In another embodiment, the first position detector 16A is configured to detect the rotating direction, the number of rotations, and the angle of the first transmission shaft 143A for generating the middle rail position messages SA, SA' and SA", while the second position detector 16B is configured to detect the rotating direction, the number of rotations, and the angle of the second transmission shaft 143B for generating the lower rail position message SB. In still another embodiment, the first position detector 16A is configured to detect the rotating direction, the number of rotations, and the angle of at least one of the first rotating members 142A for generating the middle rail position messages SA, SA' and SA", while the second position detector 16B is configured to detect the rotating direction, the number of rotations, and the angle of at least one of the second rotating members 142B for generating the lower rail position message SB. The switches 17 are used to transmit the first signal S1 when they detect the corresponding first lifting cords 15A are in a first status, and stop transmitting the first signal S1 when they detect the corresponding first lifting cords 15A are in a second status. In the present embodiment, the switches 17 are disposed on an inner bottom surface of the upper rail 11, as the second end 152A of each of the first lifting cords 15A runs through the corresponding one of the switches 17, passes out from the bottom surface of the upper rail 11, runs through the first covering material 18A, and then is connected to the middle rail 12. Each of the switches 17 transmits the first signal S1 when the corresponding first lifting cord 15A is in the first status, and stops transmitting the first signal S1 when the corresponding first lifting cord 15A is in the second status, in which the first status is a loose status, and the second status is a tense status.

Figure 3A:
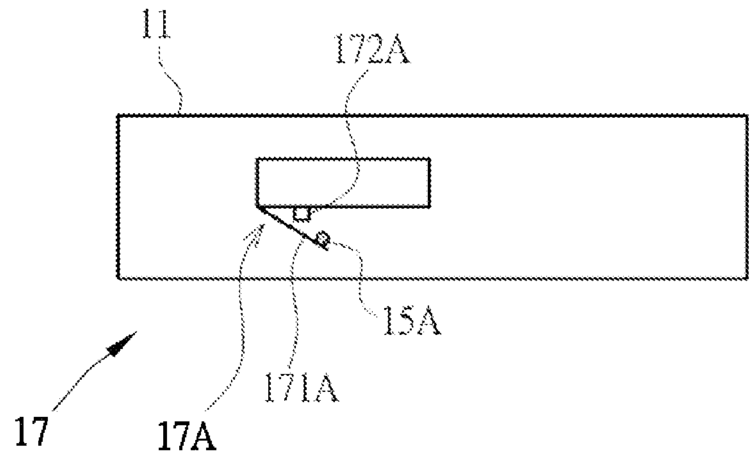
FIG. 3A schematically illustrates a top view of the switch in FIG. 1B with the lifting cord in a tense status, according to one embodiment of the present disclosure.
Figure 3B:
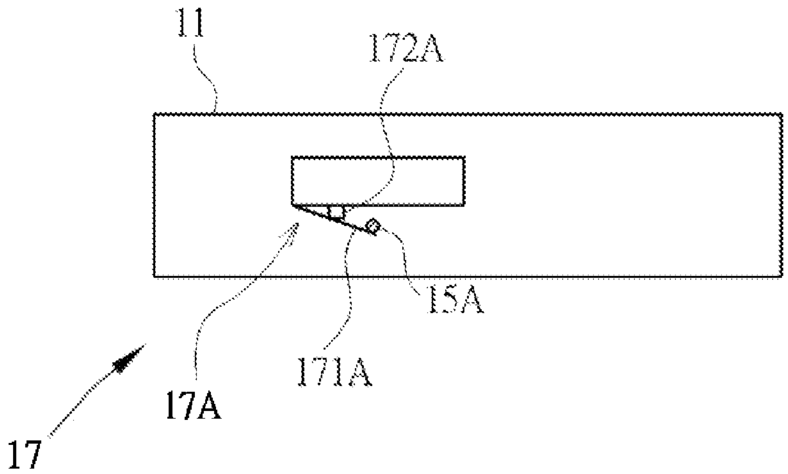
FIG. 3B schematically illustrates a top view of the switch in FIG. 3A with the lifting cord in a loose status.

Please refer to FIGS. 3A and 3B, which schematically illustrate the top views of the switch with the lifting cord in a tense status and a loose status, respectively, according to one embodiment of the present disclosure. In the embodiment shown in FIGS. 3A and 3B, the switch 17 includes a first switch 17A. The first switch 17A includes a first elastic strip 171A and a first contact 172A. When not subjected to any external force, the first elastic strip 171A and the first contact 172A are in contact, while the first lifting cord 15A runs through the first switch 17A in a manner of facing the first contact 172A and abutting against the first elastic strip 171A. When the first lifting cord 15A is tense, i.e., being in the second status, the first lifting cord 15A presses the first elastic strip 171A to move away from the first contact 172A, which results in separation of the first elastic strip 171A from the first contact 172A, as shown in FIG. 3A. By contrast, when the first lifting cord 15A is loose, i.e., being in the first status, the first elastic strip 171A is restored and in contact with the first contact 172A, as shown in FIG. 3B, which makes the first switch 17A transmit the first signal S1.

Figure 4A:
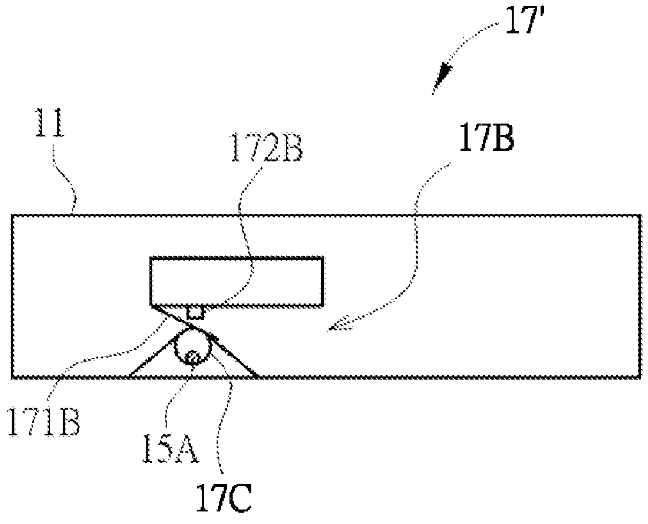
FIG. 4A schematically illustrates a top view of the switch in FIG. 1B with the lifting cord in a tense status, according to another embodiment of the present disclosure.
Figure 4B:
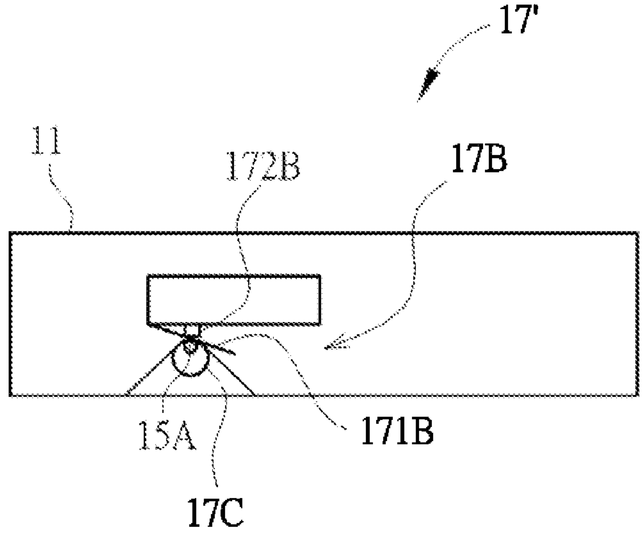
FIG. 4B schematically illustrates a top view of the switch in FIG. 4A with the lifting cord in a loose status.

Please refer to FIGS. 4A and 4B, which schematically illustrate the top views of the switch with the lifting cord in a tense status and in a loose status, respectively, according to another embodiment of the present disclosure. In the embodiment shown in FIGS. 4A and 4B, the switch 17' includes a second switch 17B and a constraining ring 17C, in which the constraining ring 17C is movable. The second switch 17B includes a second elastic strip 171B and a second contact 172B, which are separated when not subjected to any external force. The constraining ring 17C is disposed adjacent to the second elastic strip 171B and has two legs abutting against an inner side of the upper rail 11. By changing the interval of the two legs, the constraining ring 17C can be slightly displaced. When the constraining ring 17C is at a normal position, it presses the second elastic strip 171B, so that the second elastic strip 171B is in contact with the second contact 172B. The first lifting cord 15A runs through the constraining ring 17C. When the first lifting cord 15A is tense, i.e., being in the second status, the first lifting cord 15A drives the constraining ring 17C to displace in a direction away from the second elastic strip 171B, which keeps the second elastic strip 171B and the second contact 172B in a separated state, as shown in FIG. 4A. By contrast, when the first lifting cord 15A is loose, i.e., being in the first status, the constraining ring 17C is restored to the normal position and presses the second elastic strip 171B to be in contact with the second contact 172B, as shown in FIG. 4B, which makes the second switch 17B transmit the first signal S1.

Referring to FIG. 1A, FIG. 1B, and FIG. 2, the controller 20 includes the processing unit 21 and the memory unit 22. The processing unit 21 is configured to receive the signals for executing relevant determination and calculation, and to control the first motor 141A of the first driving device 14A and the second motor 141B of the second driving device 14B according to the result of the determination and calculation. The memory unit 22 is configured to store the calibration commands and/or the calibration instructions for the processing unit 21 to execute, as well as signals, messages and data for the processing unit 21 to access.

The controller 20 is electrically coupled to the switches 17, the first motor 141A of the first driving device 14A, the second motor 141B of the second driving device 14B, the first position detector 16A, and the second position detector 16B. The controller 20 is configured to control the first motor 141A of the first driving device 14A and the second motor 141B of the second driving device 14B, and to receive the first signal S1 transmitted by the switch 17, the middle rail position messages SA, SA' and SA" generated by the first position detector 16A, and the lower rail position message SB generated by the second position detector 16B.

Figure 6:
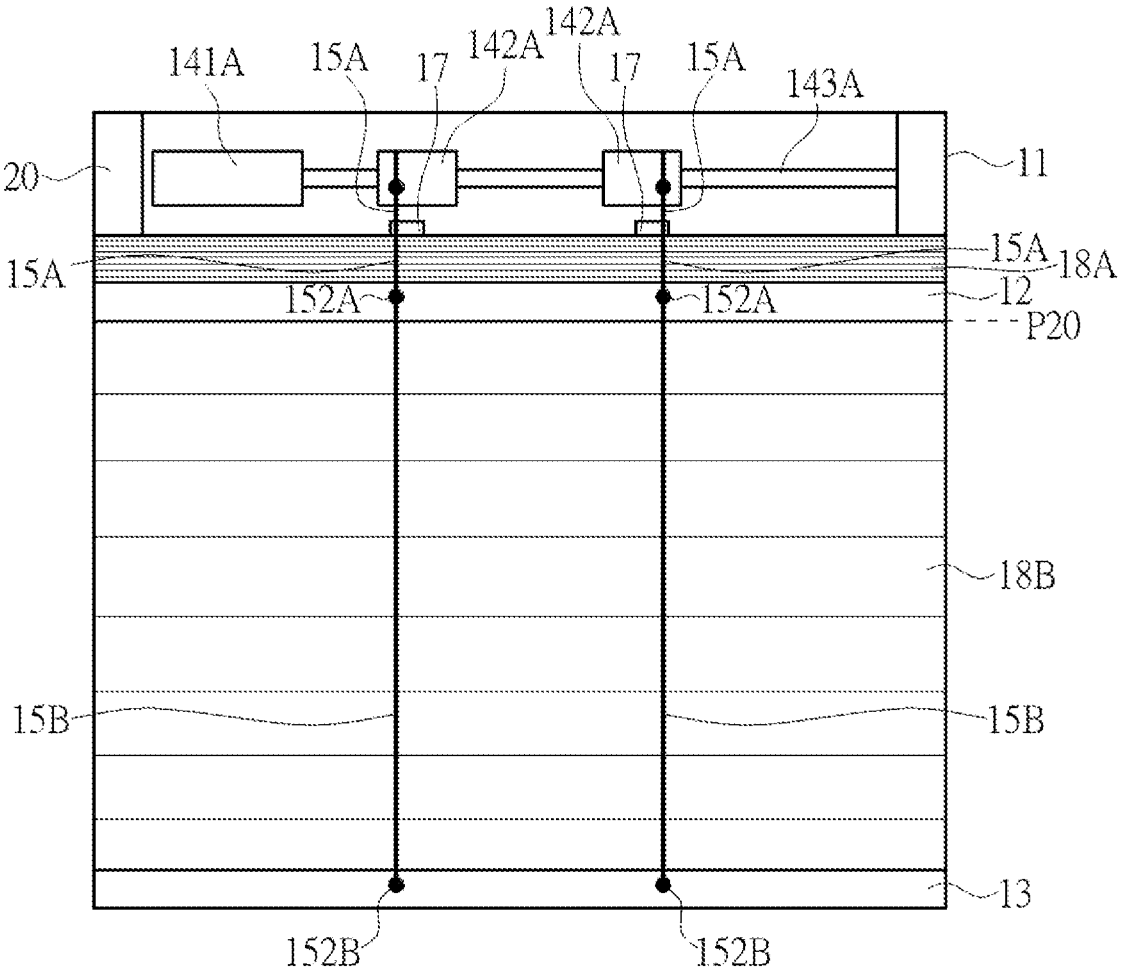
FIGS. 6 to 10 are schematical views of the window covering system corresponding to the execution of the calibration method shown in FIGS. 5A to 5C.
Figure 7:
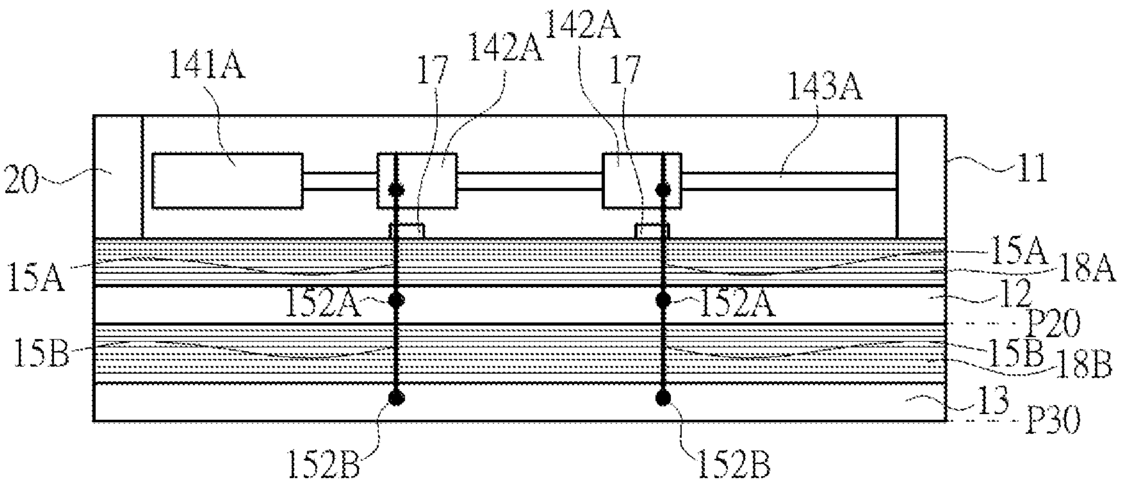

When the controller 20 determines the first motor 141A of the first driving device 14A stalls and the condition for transmitting the first protective stopping signal SP1 is satisfied, e.g., the middle rail 12 is moved up to a physical highest position as shown in FIG. 6, the controller 20 transmits the first protective stopping signal SP1 to the first motor 141A to stop the first motor 141A. As a result, the middle rail 12 is stopped from moving upwardly. Meanwhile, the first position detector 16A transmits the current position of the middle rail 12 to the controller 20, and the current position of the middle rail 12 is determined by the processing unit 21 as a middle rail initial position and stored in the memory unit 22. When the controller 20 determines the second motor 141B of the second driving device 14B stalls and the condition for transmitting the second protective stopping signal SP2 is satisfied, e.g., the lower rail 13 is moved up to a physical highest position as shown in FIG. 7, the controller 20 transmits the second protective stopping signal SP2 to the second motor 141B to stop the second motor 141B. As a result, the lower rail 13 is stopped from moving upwardly. Meanwhile, the second position detector 16B transmits the current position of the lower rail 13 to the controller 20, and the current position of the lower rail 13 is determined by the processing unit 21 as a lower rail initial position and stored in the memory unit 22.

Figure 5A:
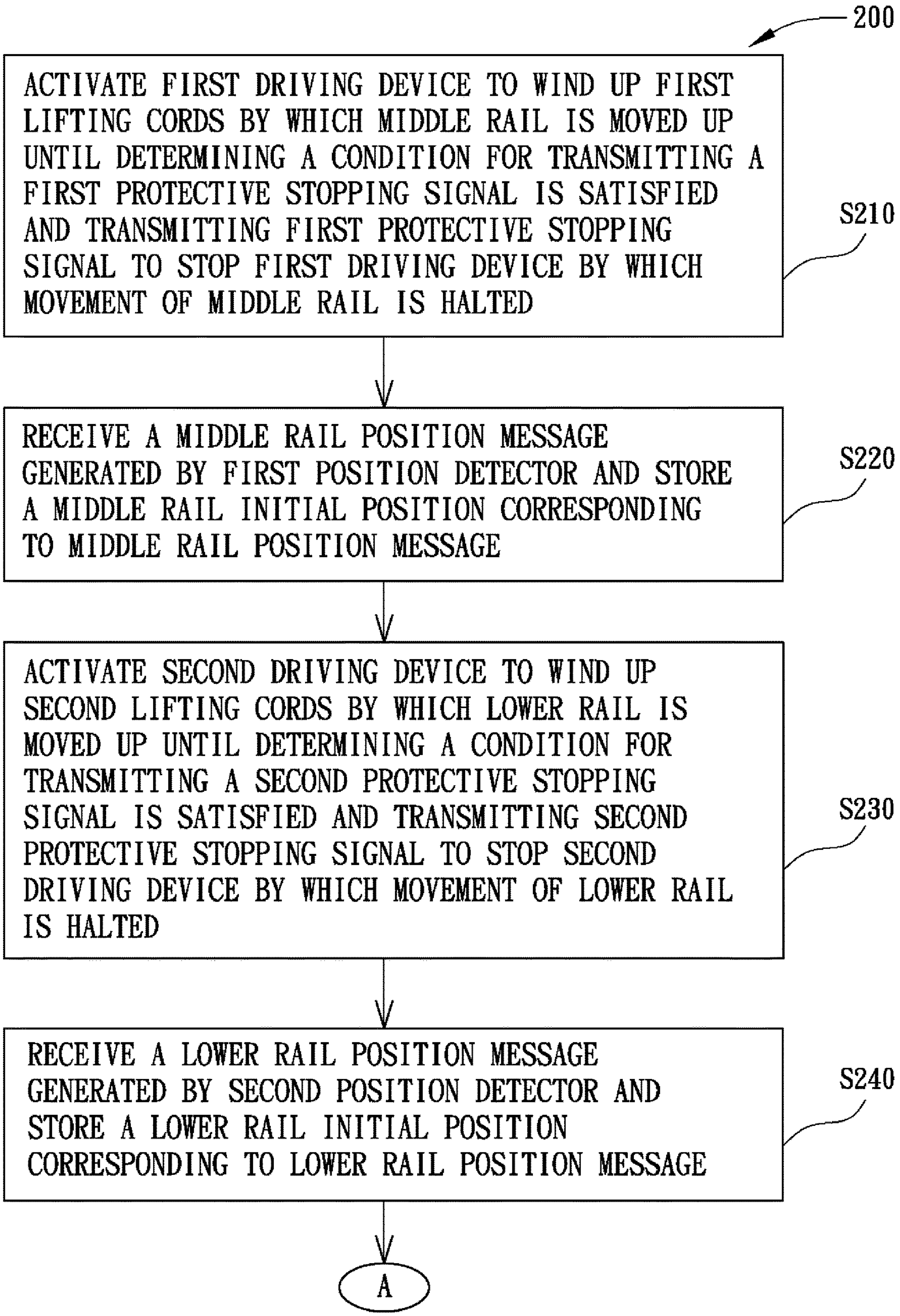
FIGS. 5A to 5C collectively show one flow diagram of a calibration method for the window covering system in FIGS. 1A and 1B.
Figure 5B:
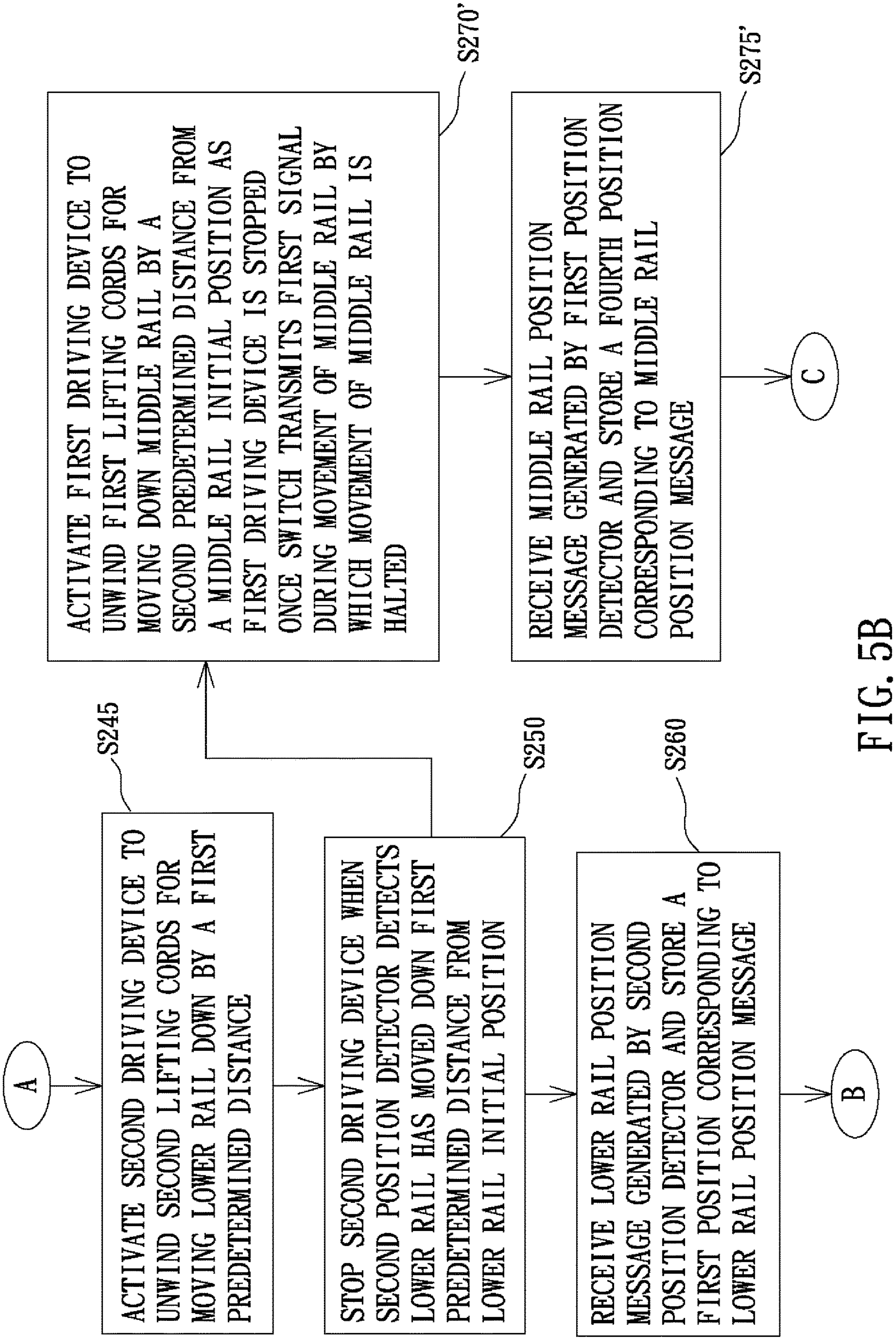
Figure 5C:
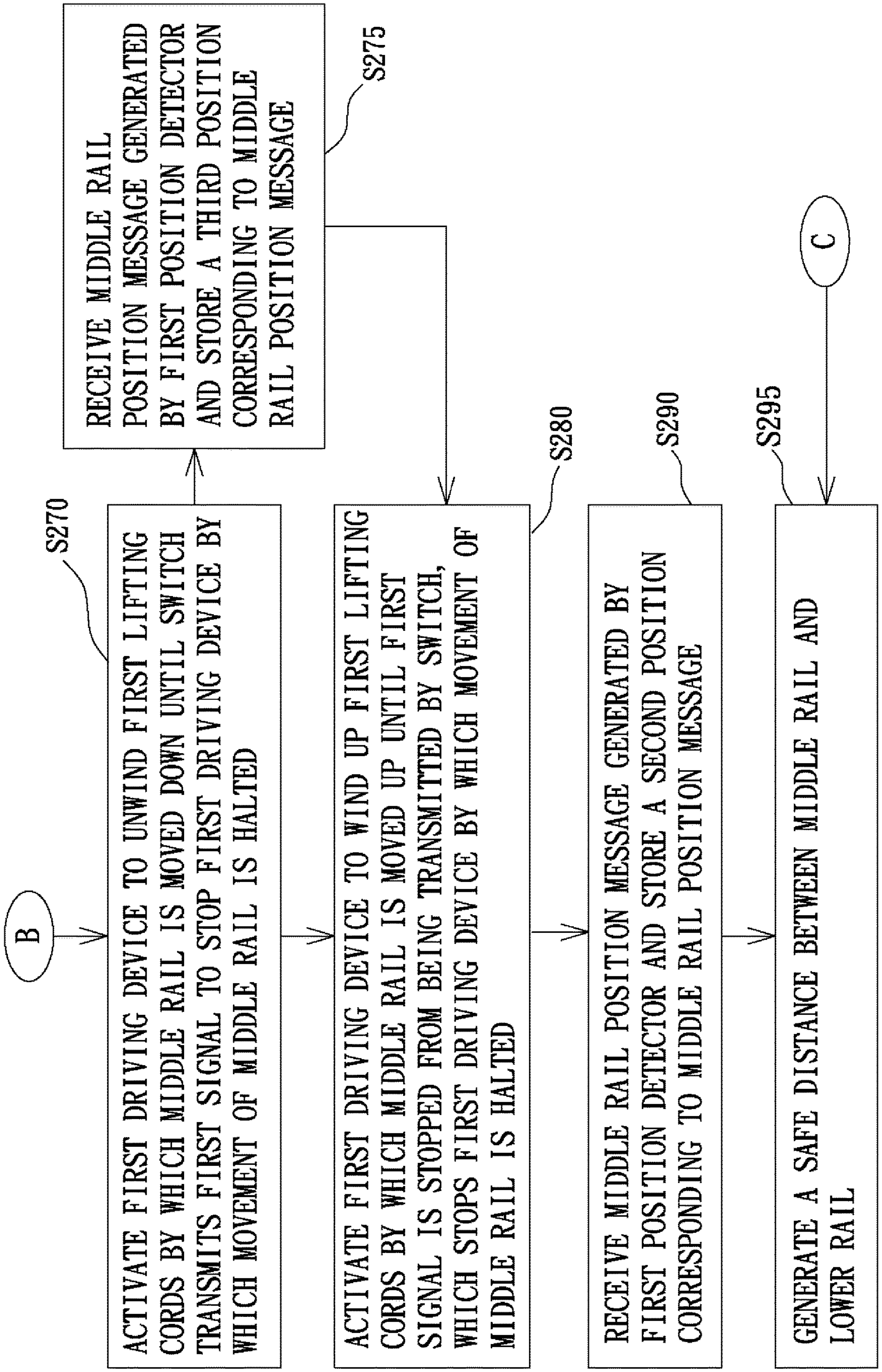

The conditions which are utilized by the controller 20 for determining whether to transmit the protective stopping signal to the driving device, includes but is not limited to: determining if at least one of the detected operation parameters of the driving devices exceed a predetermined current threshold, a predetermined voltage threshold and/or a predetermined torque threshold. FIGS. 5A to 5C collectively show one flow diagram of a calibration method 200 for the window covering system 1 in FIGS. 1A and 1B. The controller 20 is configured to control the window covering assembly 10 and execute the steps of the calibration method 200. The calibration method 200 can be applied during factory manufacturing, or can be applied as calibration commands stored in the memory unit 22, which will be executed by the processing unit 21 of the controller 20 once the user transmits a signal to activate the controller 20, through an external electronic device (not shown) or a button disposed on the window covering assembly 10 (not shown).

Figure 8:
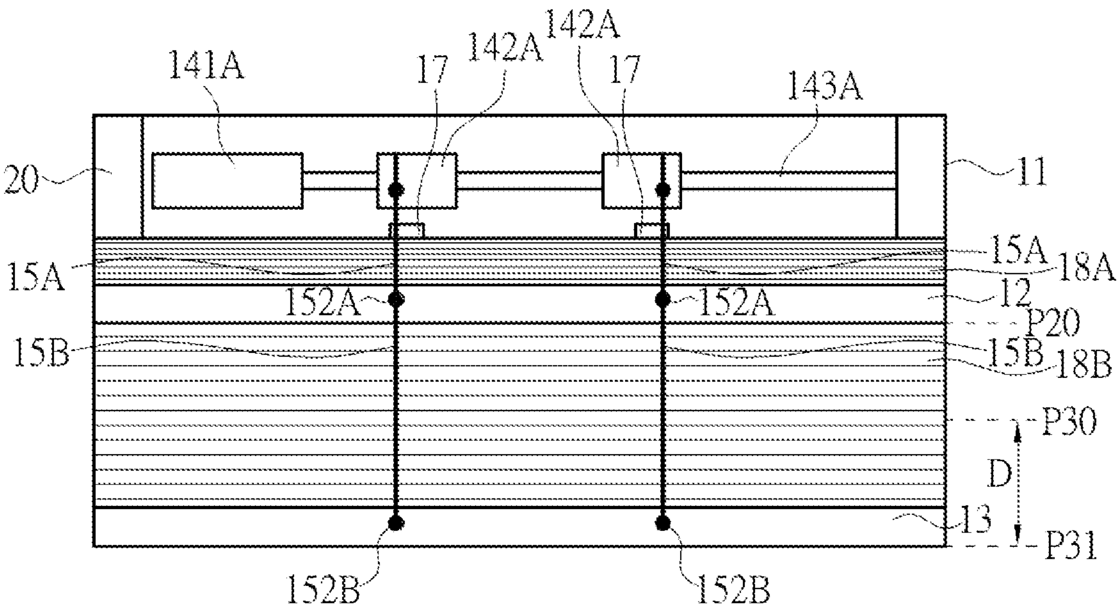
Figure 9:
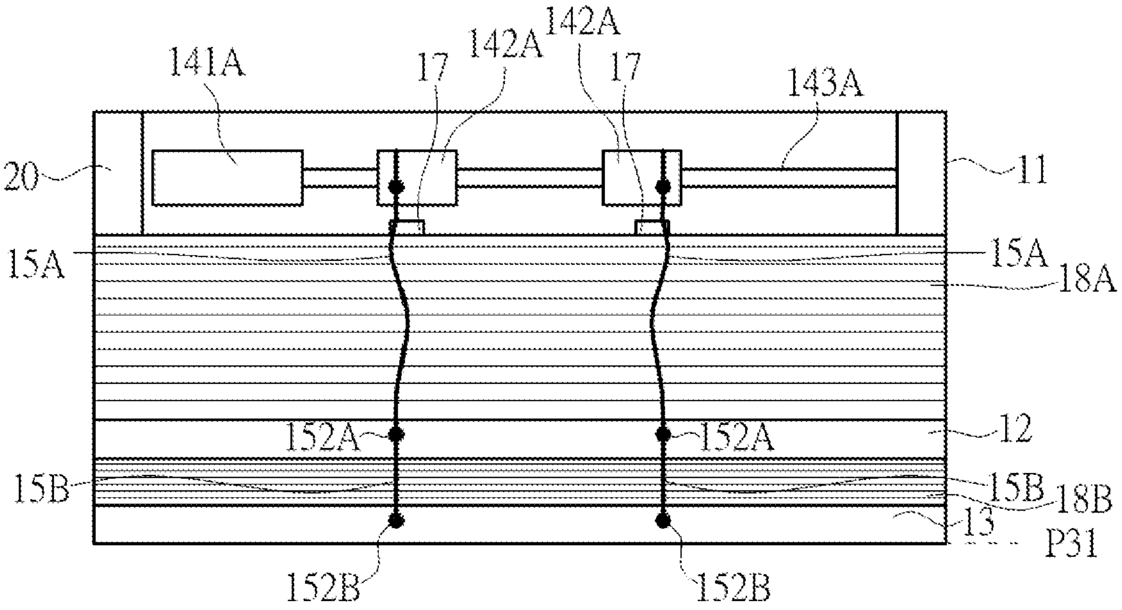
Figure 10:
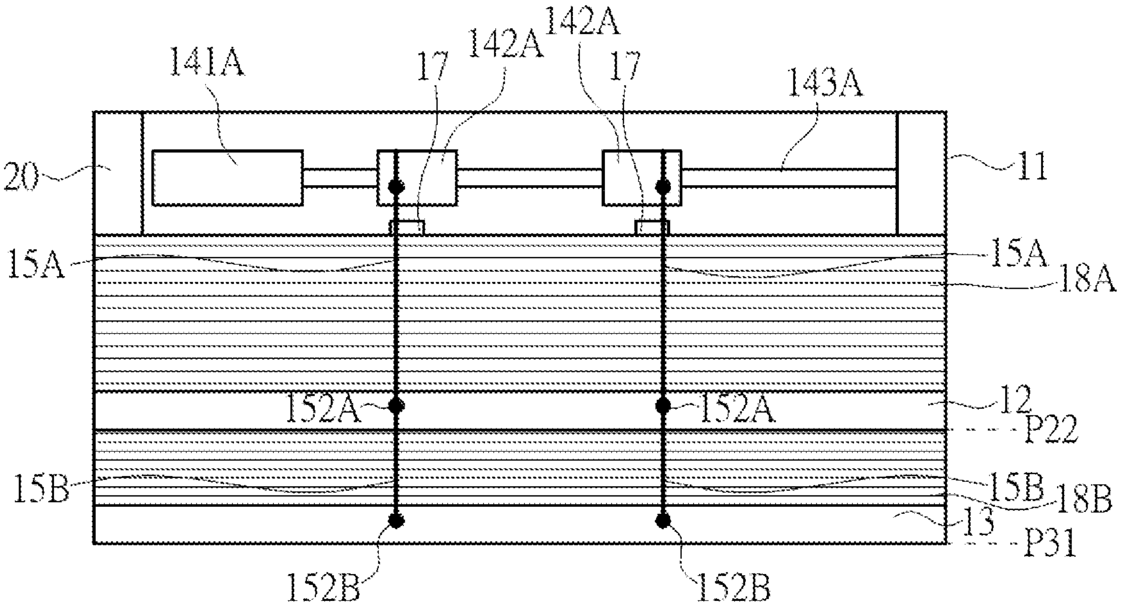

FIGS. 6 to 10 are schematic diagrams of the window covering system 1 corresponding to the execution of the calibration method 200 in FIGS. 5A to 5C, in which FIG. 6 corresponds to step S210 and step S220, FIG. 7 corresponds to step S230 and step S240, FIG. 8 corresponds to steps S245 to S260, FIG. 9 corresponds to step S270, and FIG. 10 corresponds to steps S280 to S295.

Please refer to FIG. 5A, FIG. 5B, FIG. 5C, and FIGS. 6 to 10. The calibration method 200 may include the following steps.

At step S210, the first driving device 14A is activated to wind up the first lifting cords 15A, causing the middle rail 12 to move upwardly, until the condition for transmitting the first protective stopping signal SP1 is determined to be satisfied. In response to the condition for transmitting the first protective stopping signal SP1 being satisfied, the first protective stopping signal SP1 is transmitted for stopping the first driving device 14A, and the movement of the middle rail 12 is halted.

At step S220, the middle rail position message SA generated after detection by the first position detector 16A is received, and a middle rail initial position P20 corresponding to the middle rail position message SA is stored.

At step S230, the second driving device 14B is activated to wind up the second lifting cords 15B, causing the lower rail 13 to move upwardly, until the condition for transmitting the second protective stopping signal SP2 is determined to be satisfied. In response to the condition for transmitting the second protective stopping signal SP2 being satisfied, the second protective stopping signal SP2 is transmitted for stopping the second driving device 14B, and the movement of the lower rail 13 is halted.

At step S240, the lower rail position message SB generated after detection by the second position detector 16B is received, and a lower rail initial position P30 corresponding to the lower rail position message SB is stored.

At step S245, the second driving device 14B is activated to unwind the second lifting cords 15B for moving the lower rail 13 downwardly by a first predetermined distance D.

At step S250, when the second position detector 16B detects the lower rail 13 has moved downwardly by the first predetermined distance D from the lower rail initial position P30, the second driving device 14B is stopped.

At step S260, the lower rail position message SB generated after detection by the second position detector 16B is received, and a first position P31 corresponding to the lower rail position message SB is stored.

At step S270, the first driving device 14A is activated to unwind the first lifting cords 15A, causing the middle rail 12 to move downwardly, until the switch 17 transmits the first signal S1. In response to the switch 17 transmitting the first signal S1, the first driving device 14A is stopped and the movement of the middle rail 12 is thereby halted.

At step S280, the first driving device 14A is activated to wind up the first lifting cords 15A, causing the middle rail 12 to move upwardly, until the switch 17 stops transmitting the first signal S1. In response to the switch 17 stopping transmitting the first signal S1, the first driving device 14A is stopped and the movement of the middle rail 12 is thereby halted.

At step S290, the middle rail position message SA generated after detection by the first position detector 16A is received, and a second position P22 corresponding to the middle rail position message SA is stored.

At step S295, a safe distance between the middle rail 12 and the lower rail 13 is generated.

In steps S210 and S220, the middle rail 12 can be moved upwardly to the physical highest position, at which point the first motor 141A of the first driving device 14A stalls because the movement of the middle rail 12 is limited, thereby triggering a protective stopping mechanism of the first driving device 14A. As a result, the middle rail 12 is stopped at the middle rail initial position P20. In steps S230 and S240, the lower rail 13 can be moved upwardly to the physical highest position, at which point the second motor 141B of the second driving device 14B stalls because the movement of the lower rail 13 is limited, thereby triggering a protective stopping mechanism of the second driving device 14B. As a result, the lower rail 13 is stopped at the lower rail initial position P30. The above-mentioned protective stopping mechanisms applied to the driving devices include but are not limited to an overcurrent protection mechanism, an overvoltage protection mechanism and/or a torque exceeding threshold protection mechanism. These protective stopping mechanisms can be used to detect the operation parameters of the motor and stop the motor when it stalls. When the processing unit 21 of the controller 20 determines the at least one of the operation parameters of the motor has satisfied the condition for the protective stopping mechanism, the protective stopping signal is sent.

Additionally, in steps S245 to S260, the lower rail 13 can be moved downwardly by the first predetermined distance D, in which the first predetermined distance D can be set up according to the actual material and the vertical length of the dropped covering material (e.g., the covering material 18B), and the first predetermined distance D is set up to be greater than a specific threshold, such that the switches 17 are prevented from not successfully being triggered to transmit the first signal S1 in the following step S270.

Additionally, in step 270, the middle rail 12 can be moved downwardly until at least one of the switches 17 is triggered to transmit the first signal S1 to stop the first driving device 14A and thereby halt the movement of the middle rail 12. In other words, once at least one of the first lifting cords 15A enters a first status (i.e., a loose status) during the process of the middle rail 12 moving downwardly, the first motor 141A is stopped for halting the downward movement of the middle rail 12.

Additionally, in step S280, the first lifting cords 15A can be retracted and wound up to move the middle rail 12 upwardly until the first signal S1 is stopped being transmitted from the at least one of the switches 17. In response to the halt of transmission of the first signal S1 from the at least one of the switches 17, the first driving device 14A is stopped and the movement of the middle rail 12 is thereby halted. In other words, at least one of the first lifting cords 15A is wound up until the first lifting cord 15A enters a second status (i.e., a tense status), at which point the first motor 141A is stopped for halting the downward movement of the middle rail 12.

Three exemplified methods of setting the safe distance between the middle rail 12 and the lower rail 13 are described as below:

(1) In steps S290 and S295, the safe distance between the middle rail 12 and the lower rail 13 is set up according to a difference of the first position P31 and the second position P22.

(2) The safe distance between the middle rail 12 and the lower rail 13 is set up according to a retracted length of each of the first lifting cords 15A wound up in steps S270 and S280. In this case, the step S270 further includes a sub-step S275. In sub-step S275, when the at least one of switches 17 transmits the first signal S1 and the movement of the middle rail 12 is halted, the middle rail position message SA' generated after detection by the first position detector 16A is received and stored as a third position. In steps S280 and S290, when the first signal S1 is stopped from being transmitted by the at least one of the switches 17, the current position of the middle rail 12 is stored as the second position P22. After that, based on the difference between the third position and the second position P22, the retracted length of each of the first lifting cords 15A is obtained by calculation and used for setting the safe distance between the middle rail 12 and the lower rail 13. In implementation of this exemplified method, step S260 can be optionally omitted.

(3) In this exemplified method, step 270 is replaced by step 270', and step 275 is replaced by step S275'. In step S250, the second driving device 14B is stopped after the lower rail 13 has been moved downwardly by the first predetermined distance D. After that, in step 270', the middle rail 12 is moved downwardly by a second predetermined distance. The first predetermined distance D is greater than the second predetermined distance. Once at least one of the switches 17 transmits the first signal S1 during the downward movement of the middle rail 12, the movement of the middle rail 12 is halted. The transmission of the first signal S1 by the switch 17 is triggered by a change of the status of the first lifting cord 15A that passes through the aforesaid switch 17, e.g., when the first lifting cord 15A changes from a tense status to a loose status. Meanwhile, the middle rail position message SA" generated after detection by the first position detector 16A is received, and a fourth position corresponding to the middle rail position message SA" is stored, as step S275'. After that, the safe distance between the middle rail 12 and the lower rail 13 is set up according to the difference between the fourth position and the first predetermined distance D. In implementation of this exemplified method, steps S260 to S290 can be optionally omitted.

According to different embodiments of the present disclosure, at least one of the above-mentioned three exemplified methods can be chosen to set the safe distance between the middle rail 12 and the lower rail 13.

After the processing unit 21 of the controller 20 has produced the safe distance as mentioned above, the position of the lower rail 13 can be adjusted to the current position of the middle rail 12 (e.g., the second position P22) adding the safe distance in the downward direction.

By keeping the safe distance between the middle rail 12 and the lower rail 13, the middle rail 12 is prevented from being too close to the lower rail 13, which may result in excessive slack of the first lifting cords 15A in which the first lifting cords 15A would fall off from the corresponding wound first rotating members 142A. The safe distance obtained by calculation can be stored in the memory unit 22 of the controller 20, and is used for controlling the movement of the window covering assembly 10 in the future. The safe distance generated by the calibration method 200 is produced through the actual operation of the window covering system 1 rather than being predetermined as a fixed distance, so that it can be adjusted according to the actual material and the actual vertical length of the dropped covering materials (i.e., the first covering material 18A and the second covering material 18B), and can avoid the drawback of exhibiting excessive or insufficient predetermined safe distance between the middle rail 12 and the lower rail 13.

In conclusion, the window covering system 1 and the calibration method 200 of the present disclosure provide an effective solution to set up the safe distance between the middle rail 12 and the lower rail 13, which is actually beneficial to dealing with the hard question in the field.

The embodiments described above are only some exemplary embodiments of the present disclosure. All equivalent structures which employ the concepts disclosed in this specification and the appended claims should fall within the e present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A window covering system, comprising:

a window covering assembly, comprising:

an upper rail;

a middle rail, disposed below the upper rail;

a lower rail, disposed below the middle rail;

a first driving device, disposed on the upper rail;

a second driving device, disposed on the upper rail;

a first lifting cord, connected to the first driving device and the middle rail, wherein the first driving device is configured to drive the first lifting cord to be wound up or unwound for moving the middle rail upwardly or downwardly;

a second lifting cord, connected to the second driving device and the lower rail, wherein the second driving device is configured to drive the second lifting cord to be wound up or unwound for moving the lower rail upwardly or downwardly;

a first position detector, disposed on the first driving device for detecting a current position of the middle rail and accordingly generating a middle rail position message;

a second position detector, disposed on the second driving device for detecting a current position of the lower rail and accordingly generating a lower rail position message; and a switch, configured to transmit a first signal in response to the first lifting cord in a first status and configured to stop transmitting the first signal in response to the first lifting cord in a second status; and a controller, electrically coupled to the switch, the first driving device, the second driving device, the first position detector and the second position detector for configuring the first driving device and the second driving device, and for receiving the first signal transmitted by the switch, the middle rail position message generated by the first position detector, and the lower rail position message generated by the second position detector; the controller storing a calibration command, wherein when the calibration command is executed, the controller is configured to:

activate the second driving device to unwind the second lifting cord for moving the lower rail downwardly by a first predetermined distance;

stop the second driving device in response to the lower rail moving downwardly by the first predetermined distance from a lower rail initial position, as detected by the second position detector;

receive the lower rail position message generated by the second position detector, and store the lower rail position message as a first position;

activate the first driving device to unwind the first lifting cord by which the middle rail is moved downwardly until receiving the first signal transmitted by the switch, which stops the first driving device by which movement of the middle rail is halted;

activate the first driving device to wind up the first lifting cord by which the middle rail is moved upwardly until the first signal is stopped from being transmitted by the switch, which stops the first driving device by which the movement of the middle rail is halted;

receive the middle rail position message generated by the first position detector, and store the middle rail position message as a second position; and generate a safe distance between the middle rail and the lower rail.

2. The window covering system of claim 1, wherein when the calibration command is executed, the controller is further configured to generate the safe distance between the middle rail and the lower rail according to the first position and the second position.

3. The window covering system of claim 1, wherein when the calibration command is executed, the controller is further configured to:

activate the first driving device to wind up the first lifting cord by which the middle rail is moved upwardly until determining a condition for transmitting a first protective stopping signal to the first driving device is satisfied and transmitting the first protective stopping signal to stop the first driving device by which the movement of the middle rail is halted;

receive the middle rail position message generated by the first position detector, and store the middle rail position message as a middle rail initial position;

activate the second driving device to wind up the second lifting cord by which the lower rail is moved upwardly until determining a condition for transmitting a second protective stopping signal to the second driving device is satisfied and transmitting the second protective stopping signal to stop the second driving device by which the movement of the lower rail is halted; and receive the lower rail position message generated after detection by the second position detector, and store the lower rail position message as the lower rail initial position.

4. The window covering system of claim 1, wherein each of the first position detector and the second position detector comprises an encoder.

5. The window covering system of claim 1, wherein the first driving device comprises:

a first motor; and a first rotating member, connected to the first motor and the first lifting cord and configured to be driven by the first motor to rotate in a first rotating direction for winding up the first lifting cord and configured to be driven by the first motor to rotate in a second rotating direction for unwinding the first lifting cord.

6. The window covering system of claim 1, wherein the second driving device comprises:

a second motor; and a second rotating member, connected to the second motor and the second lifting cord and configured to be driven by the second motor to rotate in a third rotating direction for winding up the second lifting cord and configured to be driven by the second motor to rotate in a fourth rotating direction for unwinding the second lifting cord.

7. The window covering system of claim 1, wherein the switch is disposed on the upper rail; the first lifting cord is configured to run through the switch for making the switch transmit the first signal in response to the first lifting cord in the first status, and making the switch stop transmitting the first signal in response to the first lifting cord in the second status; the first status is a loose status, and the second status is a tense status.

8. The window covering system of claim 1, wherein the controller comprises a processing unit and a memory unit.

9. A window covering system, comprising:

a window covering assembly, comprising:

an upper rail;

a middle rail, disposed below the upper rail;

a lower rail, disposed below the middle rail;

a first driving device, disposed on the upper rail;

a second driving device, disposed on the upper rail;

a first lifting cord, connected to the first driving device and the middle rail, wherein the first driving device is configured to drive the first lifting cord to be wound up or unwound for moving the middle rail upwardly or downwardly;

a second lifting cord, connected to the second driving device and the lower rail, wherein the second driving device is configured to drive the second lifting cord to be wound up or unwound for moving the lower rail upwardly or downwardly;

a first position detector, disposed on the first driving device for detecting a current position of the middle rail and accordingly generating a middle rail position message;

a second position detector, disposed on the second driving device for detecting a current position of the lower rail and accordingly generating a lower rail position message; and a switch, configured to transmit a first signal in response to the first lifting cord in a first status and configured to stop transmitting the first signal in response to the first lifting cord in a second status; and a controller, electrically coupled to the switch, the first driving device, the second driving device, the first position detector and the second position detector for configuring the first driving device and the second driving device, and receiving the first signal transmitted by the switch, the middle rail position message generated by the first position detector, and the lower rail position message generated by the second position detector; the controller storing calibration command, wherein when the calibration command is executed, the controller is configured to:

activate the second driving device to unwind the second lifting cord for moving the lower rail downwardly by a first predetermined distance;

stop the second driving device in response to the lower rail moving downwardly by the first predetermined distance from a lower rail initial position, as detected by the second position detector;

activate the first driving device to unwind the first lifting cord by which the middle rail is moved downwardly until receiving the first signal transmitted by the switch, which stops the first driving device by which movement of the middle rail is halted;

activate the first driving device to wind up the first lifting cord by which the middle rail is moved upwardly until the first signal is stopped from being transmitted by the switch, which stops the first driving device by which the movement of the middle rail is halted;

receive the middle rail position message generated by the first position detector, and store the middle rail position message as a second position; and generate a safe distance between the middle rail and the lower rail;

wherein when the calibration command is executed, the controller is further configured to: receive the middle rail position message generated after detection by the first position detector when the first driving device is stopped and the movement of the middle rail is halted in response to the first signal transmitted by the switch; store the received middle rail position message as a fourth position; generate the safe distance between the middle rail and the lower rail according to the fourth position and the first determined distance.

10. The window covering system of claim 9, wherein when the calibration command is executed, the controller is further configured to:

activate the first driving device to wind up the first lifting cord by which the middle rail is moved upwardly until determining a condition for transmitting a first protective stopping signal to the first driving device is satisfied and transmitting the first protective stopping signal to stop the first driving device by which the movement of the middle rail is halted;

receive the middle rail position message generated by the first position detector, and store the middle rail position message as a middle rail initial position;

activate the second driving device to wind up the second lifting cord by which the lower rail is moved upwardly until determining a condition for transmitting a second protective stopping signal to the second driving device is satisfied and transmitting the second protective stopping signal to stop the second driving device by which the movement of the lower rail is halted; and receive the lower rail position message generated after detection by the second position detector, and store the lower rail position message as the lower rail initial position.

11. The window covering system of claim 9, wherein each of the first position detector and the second position detector comprises an encoder.

12. The window covering system of claim 9, wherein the first driving device comprises:

a first motor; and a first rotating member, connected to the first motor and the first lifting cord and configured to be driven by the first motor to rotate in a first rotating direction for winding up the first lifting cord and configured to be driven by the first motor to rotate in a second rotating direction for unwinding the first lifting cord.

13. The window covering system of claim 9, wherein the second driving device comprises:

a second motor; and a second rotating member, connected to the second motor and the second lifting cord and configured to be driven by the second motor to rotate in a third rotating direction for winding up the second lifting cord and configured to be driven by the second motor to rotate in a fourth rotating direction for unwinding the second lifting cord.

14. The window covering system of claim 9, wherein the switch is disposed on the upper rail; the first lifting cord is configured to run through the switch for making the switch transmit the first signal in response to the first lifting cord in the first status, and making the switch stop transmitting the first signal in response to the first lifting cord in the second status; the first status is a loose status, and the second status is a tense status.

15. A window covering system, comprising:

a window covering assembly, comprising:

an upper rail;

a middle rail, disposed below the upper rail;

a lower rail, disposed below the middle rail;

a first driving device, disposed on the upper rail;

a second driving device, disposed on the upper rail;

a first lifting cord, connected to the first driving device and the middle rail, wherein the first driving device is configured to drive the first lifting cord to be wound up or unwound for moving the middle rail upwardly or downwardly;

a second lifting cord, connected to the second driving device and the lower rail, wherein the second driving device is configured to drive the second lifting cord to be wound up or unwound for moving the lower rail upwardly or downwardly;

a first position detector, disposed on the first driving device for detecting a current position of the middle rail and accordingly generating a middle rail position message;

a second position detector, disposed on the second driving device for detecting a current position of the lower rail and accordingly generating a lower rail position message; and a switch, configured to transmit a first signal in response to the first lifting cord in a first status and configured to stop transmitting the first signal in response to the first lifting cord in a second status; and a controller, electrically coupled to the switch, the first driving device, the second driving device, the first position detector and the second position detector for configuring the first driving device and the second driving device, and receiving the first signal transmitted by the switch, the middle rail position message generated by the first position detector, and the lower rail position message generated by the second position detector; the controller storing a calibration command, wherein when the calibration command is executed, the controller is configured to:

activate the second driving device to unwind the second lifting cord for moving the lower rail downwardly by a first predetermined distance;

stop the second driving device in response to the lower rail moving downwardly by the first predetermined distance from a lower rail initial position, as detected by the second position detector; and generate a safe distance between the middle rail and the lower rail;

wherein when the calibration command is executed, the controller is further configured to: activate the first driving device to unwind the first lifting cord by which the middle rail is moved downwardly until receiving the first signal transmitted by the switch, which stops the first driving device by which movement of the middle rail is halted; receive the middle rail position message generated after detection by the first position detector, and store the received middle rail position message as a fourth position; generate the safe distance between the middle rail and the lower rail according to the fourth position and the first predetermined distance.

16. The window covering system of claim 15, wherein when the calibration command is executed, the controller is further configured to:

activate the first driving device to wind up the first lifting cord by which the middle rail is moved upwardly until determining a condition for transmitting a first protective stopping signal to the first driving device is satisfied and transmitting the first protective stopping signal to stop the first driving device by which the movement of the middle rail is halted;

receive the middle rail position message generated by the first position detector, and store the middle rail position message as a middle rail initial position;

activate the second driving device to wind up the second lifting cord by which the lower rail is moved upwardly until determining a condition for transmitting a second protective stopping signal to the second driving device is satisfied and transmitting the second protective stopping signal to stop the second driving device by which the movement of the lower rail is halted; and receive the lower rail position message generated after detection by the second position detector, and store the lower rail position message as the lower rail initial position.

17. The window covering system of claim 15, wherein each of the first position detector and the second position detector comprises an encoder.

18. The window covering system of claim 15, wherein the first driving device comprises:

a first motor; and a first rotating member, connected to the first motor and the first lifting cord and configured to be driven by the first motor to rotate in a first rotating direction for winding up the first lifting cord and configured to be driven by the first motor to rotate in a second rotating direction for unwinding the first lifting cord.

19. The window covering system of claim 15, wherein the second driving device comprises:

a second motor; and a second rotating member, connected to the second motor and the second lifting cord and configured to be driven by the second motor to rotate in a third rotating direction for winding up the second lifting cord and configured to be driven by the second motor to rotate in a fourth rotating direction for unwinding the second lifting cord.

20. The window covering system of claim 15, wherein the switch is disposed on the upper rail; the first lifting cord is configured to run through the switch for making the switch transmit the first signal in response to the first lifting cord in the first status, and making the switch stop transmitting the first signal in response to the first lifting cord in the second status; the first status is a loose status, and the second status is a tense status.

* * * * *